United States Patent [19]

Priebe et al.

[11] Patent Number: 5,869,188
[45] Date of Patent: Feb. 9, 1999

[54] ELECTROSTATOGRAPHIC MEMBER AND SYSTEM FOR ELECTROSTATOGRAPHIC REPRODUCTION AND METHOD FOR PREPARING SAME

[75] Inventors: Alan R. Priebe; Michael E. Luckhurst, both of Rochester, N.Y.

[73] Assignee: Eastman Kodak Company, Rochester, N.Y.

[21] Appl. No.: 806,173

[22] Filed: Feb. 26, 1997

[51] Int. Cl.$^6$ .................................................. B32B 15/04
[52] U.S. Cl. ........................... 428/457; 428/461; 492/56; 204/164; 250/324; 422/186.06
[58] Field of Search ................................ 428/457, 461; 492/56; 204/164; 250/324; 422/186.06

[56] References Cited

U.S. PATENT DOCUMENTS

| | | | |
|---|---|---|---|
| 4,002,907 | 1/1977 | Kalwar | 250/325 |
| 4,153,560 | 5/1979 | Dinter et al. | 250/531 |
| 4,239,973 | 12/1980 | Kolbe et al. | 250/531 |
| 4,298,440 | 11/1981 | Hood | 204/165 |
| 4,649,097 | 3/1987 | Tsukada et al. | 430/270 |
| 4,772,788 | 9/1988 | Tsutsui et al. | 250/324 |
| 4,774,061 | 9/1988 | Ahlbrandt | 422/186.05 |
| 4,879,100 | 11/1989 | Tsutsui et al. | 422/186.05 |
| 4,940,521 | 7/1990 | Dinter et al. | 204/164 |
| 5,026,463 | 6/1991 | Dinter et al. | 204/164 |
| 5,038,036 | 8/1991 | Kouguchi et al. | 250/324 |
| 5,051,586 | 9/1991 | Sabreen | 250/324 |
| 5,135,724 | 8/1992 | Dinter et al. | 422/186.05 |
| 5,194,291 | 3/1993 | D'Aoust et al. | 148/276 |
| 5,236,536 | 8/1993 | Brehm et al. | 156/345 |
| 5,268,259 | 12/1993 | Sypula | 430/311 |
| 5,269,740 | 12/1993 | Fitzgerald et al. | 492/56 |
| 5,292,562 | 3/1994 | Fitzgerald et al. | 428/35.8 |
| 5,292,606 | 3/1994 | Fitzgerald | 428/35.8 |
| 5,466,423 | 11/1995 | Brinton et al. | 422/186.05 |
| 5,466,424 | 11/1995 | Kusano et al. | 422/186.05 |
| 5,488,222 | 1/1996 | Gault et al. | 250/324 |

*Primary Examiner*—Mark Chapman
*Attorney, Agent, or Firm*—J. Lanny Tucker

[57] ABSTRACT

An electrostatographic member for use in electrostatographic processes is prepared by directly applying an elastomeric layer to a metal support (or core) that has been treated with corona discharge without primers or intermediate treatments. Adhesion of the elastomeric layer directly to the treated metal support is excellent. One or more such fuser members can be used in combination in an electrostatographic fuser system, such as the combination of a fuser roller and a pressure roller. Intermediate transfer members can also be prepared in this manner.

18 Claims, No Drawings

ELECTROSTATOGRAPHIC MEMBER AND SYSTEM FOR ELECTROSTATOGRAPHIC REPRODUCTION AND METHOD FOR PREPARING SAME

FIELD OF THE INVENTION

This invention relates to electrostatographic members and to methods of preparing them. More particularly, the invention relates to an electrostatographic fuser member having a metal support and at least one elastomeric layer, and to methods of their preparation. The invention also relates to an electrostatographic fuser system having two or more fuser members in combination.

BACKGROUND OF THE INVENTION

In electrostatography, an image charge pattern (also referred to as an electrostatic latent image) is formed on an imaging element and is then developed by treatment with an electrostatographic developer containing toner particles (collectively "toner") that are attracted to the charge pattern. The resulting toner image can be transferred to a receiver such as a sheet of paper, and fused (or fixed) to the receiver in a fuser system.

The fusing system typically applies heat and pressure to the toner bearing receiver by passage through a nip defined by a pair of opposing fuser members, such as a pair of rollers maintained in pressure contact (one or both being heated, such as a combination of a fuser roller and a pressure roller), a flat or curved plate member and a roller in pressure contact, or a belt in pressure contact with a roller. Heat may be applied by heating one or both of the fuser members. Heat is necessary to make the toner particles tacky and flowable into the fibers or pores of the receiver, providing firm bonding thereto.

Members of a useful fuser system generally are referred to as "fuser members", and can include one or more fuser rollers, and one or more pressure rollers. The fuser roller generally contacts the toner image while the pressure roller (or backup roller) contacts the opposite surface of the receiver.

Alternatively, the toner image on the imaging element can be transferred from the imaging element to an intermediate transfer member (ITM), and then transferred from the ITM to a receiver and fixed in the fuser system. Transferring toner images to the ITM is particularly desirable when forming multi-color images, because the individual color separations in the image can be developed separately on the imaging member, transferred separately from the imaging element to the ITM so that the individual color separations are accumulated in registration on the ITM, and then the accumulated color separations are transferred in one step from the ITM to the receiver.

It is known to use fuser members comprising metal supports having one or more elastomeric layers disposed thereon. The elastomeric layers provide the proper nip width, thermal and electrical properties, and release characteristics for both fusing and image transfer. However, obtaining strong adhesion between the elastomeric materials and the metal supports is a continuing challenge in the industry. By improving the adhesion between the elastomeric layer and the metal, the useful life of the fuser members can be extended.

Various means have been tried to provide the desired adhesion between elastomeric layers and the metal supports, including mechanical and chemical treatments, such as chemical etching, alkaline treatment and acid anodizing.

Another way to address this problem is to use primer layers between elastomeric layers and metal supports of fuser members, as described for example, in U.S. Pat. No. 4,196,256 (Eddy et al). Further, U.S. Pat. No. 5,474,821 (Kass) discloses the use of chromate conversion to improve the adhesion of silicone rubber to an aluminum support in the production of a fuser member.

However, methods of applying primers and chromate conversion suffer from the drawbacks that they are imprecise and provide an uneven application of the materials to the surface of the support, resulting in uneven adhesion of the elastomeric materials to the supports, and shorter useful life for fuser members. Additionally, these methods require increased manufacturing times, to allow the primers and conversion coatings to dry. Primers and the solvents from which they are coated pose an environmental concern, both to the manufacturing workers as well as to the general public. All of these disadvantages have prompted workers in the art to explore novel solutions to the adhesion problem.

Corona discharge is well known as a treatment for improving the adhesion of various materials to resins, composites, and metals of various shapes. Particularly, it is known for improving the adhesion of thermoplastic resins to various coatings (see U.S. Pat. No. 5,466,423 of Brinton et al). Vulcanized resins of various shapes (including golf balls) have been treated with corona discharge to change surface characteristics as described in U.S. Pat. No. 5,466,424 (Kusano et al).

U.S. Pat. No. 4,988,536 (Van Dongen et al) describes the use of corona discharge treatment of metals having a lightly oiled surface to improve the adhesion thereto of lacquers.

U.S. Pat. No. 5,547,759 (Chen et al) describes the use of various treatments including primer layers and corona discharge to adhere one elastomeric layer to another on a fuser member.

It would be desirable to have a method of providing improved adhesion between an elastomeric layer and the bare metal support of electrostatographic members, such as fuser members, without the use of primers or other treatments of known methods that cause problems.

SUMMARY OF THE INVENTION

The invention provides a method for preparing an electrostatographic member comprising the steps of:

A) corona discharge treatment of a metal support, and

B) without intermediate treatment or coating, providing a first elastomeric layer over the corona discharge treated metal support.

This invention also provides an electrostatographic member obtained from this method, and a fuser system comprising two or more members obtained by this method, used in combination.

This invention provides an electrostatographic member that has high resistance to delamination of the elastomeric layer from the metal support, and therefore, having a longer useful life. Other advantages of the method of this invention over the use of primers and conversion coatings are more uniform treatment, process controllability, and shorter process times (no drying/reaction time required). Still another advantage of this invention is that no volatile organics are generated and discharged to the environment.

DETAILED DESCRIPTION OF THE INVENTION

The electrostatographic member prepared by this invention includes any member that is useful in electrophotography for the application or fixing of images, or for the transport of paper, or both. Such members generally have one or more elastomeric layers are adhered to a metal support. Such members include "fuser members", as well as biasable transfer members, for example, "intermediate transfer members". As used herein, "fuser member" includes what are known as heated or unheated fuser rollers, or pressure rollers. A "fuser system" is considered an apparatus having at least two fusing members, at least one being a member in contact with the toner, and at least one being in contact with the backside of the receiver. Most often, in such systems, a fuser roller and a pressure roller are used in pairs or in combination (see for example, U.S. Pat. No. 4,272,179 of Seanor). The fuser members can take any shape, for example, flat plates, belts or rollers. Preferably, the fuser member is a roller, and each fuser member in a fuser system is a roller.

In the electrostatographic members of this invention, at least one elastomeric layer is directly adhered to the metal support. Thus, there are no intermediate layers between the metal support and the elastomeric layer because the corona discharge treatment described herein enables excellent adhesion without the need for intermediate primer layers, or other known surface treatments.

The electrostatographic member comprises a metal support of any suitable metal such as steel, aluminum, copper, nickel, zinc, titanium, and magnesium. The preferred metal support is an aluminum support. Where the fuser member is a roller, the metal support is a metal cylinder, also referred to as a core, and more preferably it is a hollow metal core of a suitable thickness to provide dimensional stability. The metal support can be of any suitable roughness, although a skilled worker would understand that generally smoother surfaces are more effectively treated with corona discharge than highly roughened surfaces.

The metal support can be machined, cast, extruded, sintered or otherwise prepared or treated as is known in the art prior to corona discharge. Preferably, the metal cores are machined by techniques known to a person of ordinary skill in the art. Useful metal supports are commercially available, for example, from VAW Corp.

Prior to corona discharge treatment, the metal supports may be cleaned to remove organic contaminants, any loose debris, or any other undesirable materials that might be present on the surface of the metal support from manufacture or storage. It is preferred to clean the support using a solvent that will not leave a residue on the support surface after drying. The support can be wiped with a pad or other material dampened with the solvent. Suitable solvents are well known to those skilled in the art, but a preferred solvent is isopropyl alcohol.

The metal support is corona discharge treated using any suitable method and apparatus known in the art. The term "corona-discharge treated" is used herein to refer to processes which involve generation of an electrical discharge wherein the resulting plasma or corona is impinged upon the surface of the metal support to be treated. The resulting treated surface generally exhibits increased surface energy and improved wettability. The surface treatment processes and equipment for such treatment include, but are not limited to, those described in U.S. Pat. Nos. 5,466,423 (Brinton et al), 5,194,291 (D'Aoust et al) and 4,649,097 (Tsukada et al), all incorporated herein by reference. Currently preferred are conventional corona discharge treatment techniques that utilize a power supply and electrode assembly. Convenient treatment units are those supplied by Enercon Industries Corp., ENI Power Systems, or Corotec Corp. It is preferred that the corona discharge treatment is applied to the support at atmospheric pressure and in ambient air. The electrode geometry can be readily chosen or tailored to meet the needs of the process, depending upon the shape of the metal support, as one skilled in the art would understand. In a preferred embodiment, the metal supports are round cores and thus the electrode geometry was arranged to uniformly treat the circular outer surface of the cores.

Important variables in carrying out the present invention are the time and power level of corona discharge treatment, and the time between the treatment and subsequent application of the first elastomeric layer. It has been found that there are wide ranges of these variables useful in the present invention, and that they are interrelated according to the following mathematical Equation 1:

$$A=1.863+[(0.6274)\times \tilde{T}]+[(-0.2979)\times \tilde{TP}]+[(0.3122\times \tilde{T}\times \tilde{P}]+[(-0.4903)\times \tilde{T}^2]$$

wherein "A" is elastomeric layer adhesion to the metal support, "$\tilde{T}$" is the transformed corona discharge treatment time (seconds), and "$\tilde{TP}$" is the transformed time (minutes) between corona discharge treatment and application (for example, molding) of the elastomeric layer. The development of Equation 1 is described in more detail below.

Moreover, the power level for the corona discharge treatment should be adequate to sufficiently activate the surface in a reasonable amount of time. The power level and treatment time for sufficient activation of the surface of the metal are inversely related. Generally, the power level should be between about 200 to about 1200 watts, more preferably from about 300 to about 1000 watts, and most preferably from about 750 to about 850 watts. The treatment times are generally from about 10 to about 200 seconds, preferably from about 15 to about 150 seconds and most preferably from about 70 to about 110 seconds. However, it should be understood from the previously discussion, that power levels and treatment times outside these ranges can be found useful with routine experimentation and the proper power supply and electrode assembly.

When lower power levels are used in corona discharge treatment, for example a power level of less than about 650 watts, it is preferred that the metal support be allowed to stand for up to about 50 minutes before coating with the elastomeric layer. More preferably, it should stand for up to about 35 minutes, and most preferably for up to about 10 minutes.

When higher power levels are used (that is, more than about 650 watts), it is preferred that the metal support be allowed to stand for up to about 180 minutes before coating with the elastomeric layer. More preferably, it should stand for up to about 120 minutes, and most preferably for up to about 30 minutes. Clearly, as the power level is increased, there can be a greater period of time between steps A and B of the present invention.

For most common power levels (from about 200 to about 1200 watts), the most desirable time between corona discharge treatment and application of the elastomeric layer is about 5 minutes or less.

A preferred combination of corona discharge treatment features includes a power level of from about 750 to about 850 watts for a time of from about 70 to about 110 seconds, and a time of less than about 1 minute between steps A and B.

The elastomeric layers disposed on the corona discharge treated metal support are generally thermally insulating elastomeric compositions comprising elastomeric materials that include, but are not limited to, silicone rubbers, fluorosilicone rubbers, fluoroelastomers, polyurethanes, ethylenepropylene dimers, and mixtures and copolymers of these materials. The preferred materials are silicone rubbers, polyurethanes, and fluoroelastomers, with the first and third type of materials being more preferred. The most preferred materials are the silicone rubbers, especially for fuser members. These materials can be applied in one or more layers of the same or different materials. Obviously, the first applied layer is directly adhered to the metal support after corona discharge treatment.

The total thickness of the elastomeric layer or layers can vary depending upon the desired compliancy or noncompliancy of the fuser member. The thickness is generally from about 0.005 to about 5 inches (0.013–12.7 cm), or more preferably, from about 0.02 to about 3 inches (0.05–7.6 cm), and most preferably from about 0.02 to about 0.5 inches (0.05–1.3 cm). Thicker or thinner layers may be used if desired. In addition, if there are multiple layers of elastomeric materials, the layers can have the same or different thicknesses.

In a preferred embodiment of the invention, the elastomeric material is a silicone elastomer molding compound, that is, a silicone rubber suitable for use in molding onto the metal support. Such silicone molding compounds are characterized by low surface energy, relatively high tensile strength and tear strength and relatively low elongation. They can comprise addition or condensation cured silicone rubbers. The preferred addition-cured silicone molding compound is a two-component, room temperature vulcanizing (RTV) silicone cured by catalyzed hydrosilation curing. The two-part liquid silicone elastomer is cross-linked via an addition reaction between vinyl and hydride functionalities, accelerated by a platinum catalyst. An commercial example of such a silicone molding compound is SILASTIC J RTV (available from Dow Corning). Another silicone molding compound is ECCOSIL JT marketed by Grace Specialty Polymers of Canton, Mass. The characteristics of these materials are well known, as described for example in U.S. Pat. No. 5,474,821 (noted above), incorporated herein by reference with respect to the common elastomeric materials.

In one embodiment, two parts of SILASTIC J RTV are mixed with SILASTIC J RTV Curing Agent (crosslinking agent marketed with SILASTIC J RTV), molded onto the fuser member support using a steel mold, and then vulcanized. However, it is preferred to heat cure the silicone molding compound. After cooling, second or additional elastomeric layers (described below) can be applied.

Inert fillers may be added to any of the described elastomeric layer compositions, especially the silicone elastomers, to provide added strength, and thermal conductivity. Examples of useful fillers include particulate fillers or pigments including, but not limited to, metals (such as tin and zinc), metal oxides (such as aluminum oxide and tin oxide), metal hydroxides (such as calcium hydroxide), mineral oxides (such as, silicate), minerals (such as silica), and carbon of various grades, or combinations of such fillers. The filler can be present in the elastomeric layer at from 0 to about 50 percent of the total volume of the layer.

Examples of suitable materials are filled condensation-crosslinked PDMS elastomers disclosed in U.S. Pat. No. 5,269,740 (Fitzgerald et al, copper oxide filler), U.S. Pat. No. 5,292,606 (Fitzgerald, zinc oxide filler), U.S. Pat. No. 5,292,562 (Fitzgerald et al, chromium oxide filler), U.S. Pat. No. 5,480,725 (tin oxide filler), U.S. Pat. No. 5,464,703 (tin oxide) and U.S. Pat. No. 5,464,698 (tin oxide). Additional suitable materials are disclosed in U.S. Pat. No. 5,466,533 (Fitzgerald et al) and U.S. Pat. No. 5,474,852 (Fitzgerald et al). These documents are incorporated herein by reference for their teaching about elastomeric compositions.

In a preferred embodiment, the elastomeric layer comprises no metal-containing fillers.

Useful fluorosilicone elastomeric layers include those prepared using polymethyltrifluoro-propylsiloxanes, such as SYLON™, and FLUOROSILICONE FX11293 and FX11299 (available from 3M Corp.). Such materials are described, for example, in U.S. Pat. No. 5,547,759 (noted above), incorporated herein by reference.

Fluoroelastomers useful in the practice of this invention include, but are not limited to, cured fluorocarbon random copolymers comprising subunits with the following general structures:

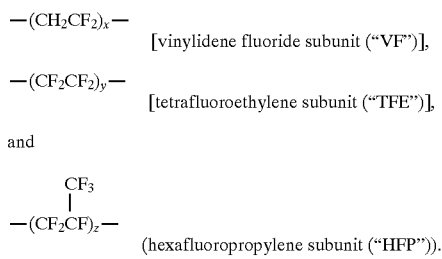

$-(CH_2CF_2)_x-$ [vinylidene fluoride subunit ("VF")], $-(CF_2CF_2)_y-$ [tetrafluoroethylene subunit ("TFE")], and $-(CF_2CF)_z-$ with $CF_3$ side group (hexafluoropropylene subunit ("HFP")).

In these formulae, x, y, and z are mole percentages of the individual subunits relative to a total of the three subunits (x+y+z). Generally, x is from about 42 to about 58 mole percent, y is from about 26 to about 44 mole percent, and z is from about 5 to about 22 mole percent. In the most preferred fluoroelastomeric embodiments of the invention, x, y, and z are selected such that fluorine atoms represent between about 69 and about 74, and more preferably between about 70 to about 72 percent of the total formula weight of the VF, HFP, and TFE subunits. The uncured fluoroelastomer preferably has a number average molecular weight in the range of from about 10,000 to about 200,000. Additional details of such polymers, methods of making them including the use of crosslinking agents, additives (such as fillers), commercially available materials and polymer characteristics are provided in U.S. Pat. No. 5,547,759 (noted above).

In one procedure to form a fluoroelastomer layer on a metal support, an uncured fluorocarbon polymer, crosslinking agent, and any other additives, such as an accelerator, and an acid acceptor type filler, are mixed to form a composite which is then applied over the corona discharge treated support and suitably cured (using heat and/or a suitable curing agent).

The fuser member supports can also be coated with the fluoroelastomer composite by conventional techniques, such as ring coating, dip coating or spray coating. Coating solvents that can be used include polar solvents, for example, ketones, acetates and the like.

Suitable uncured fluoroelastomers useful in this invention are also available commercially. Preferred fluorocarbon polymers for the elastomeric layer are vinylidene fluoride-co-hexafluoropropylene-co-tetrafluoroethylene available under the trade name FLUOREL FX-9038 (3M), and vinylidene fluoride-co-hexafluoropropylene-co-tetrafluoroethylene available under the trade name FE-5840Q (3M). Other fluoroelastomer layers comprise copolymers of vinylidene fluoride and hexafluoropropylene marketed by E.I. duPont de Nemours and Company under the designation "Viton A" and marketed by Minnesota Mining and Manufacturing under the designation "FLUOREL FX-2530", and terpolymers of vinylidene fluoride, hexafluoropropylene and tetrafluoroethylene sold by E.I. duPont de Nemours and Company under the designation "Viton B". Still other suitable fluoroelastomers are disclosed in U.S. Pat. No. 5,035,950 (Del Rosario), incorporated herein by reference.

The compositions of fluoroelastomers can also include inert fillers as described above for the silicone elastomer compositions.

An interpenetrating network comprising a separately crosslinked silicone polymer and a fluoroelastomer can also be used in the practice of this invention. Useful compositions providing interpenetrating networks are disclosed, for example, in U.S. Pat. No. 5,547,759 (noted above).

Polyurethanes useful as the elastomeric layer include those described in U.S. Pat. No. 4,729,925 (Chen et al), incorporated herein by reference. The polyurethane elastomers are made from certain polyisocyanate prepolymers and polyols by copolymerizing with the polyisocyanate prepolymers and polyol hardening compounds, and certain polyol charge control agents formed from certain carboxylated aromatic sulfonate salts which have been esterified with polyester diols or certain carboxylated aromatic sulfonamidosulfonyl salts esterified with polyester diols using well known conditions and reactants. The polyurethanes are particularly useful in intermediate transfer members (ITM's).

Additionally, U.S. Pat. No. 5,212,032 discloses as coating materials for biasable transfer members (including IMT's), certain elastomeric polyurethanes containing, as conductivity control agents or charge control agents for controlling the resistivity of the elastomeric coating and hence that of the biasable transfer member to a range from about $10^7$ to about $5 \times 10^{10}$ ohm cm, certain ionizable ferric halides selected from the group consisting of ferric fluoride, ferric chloride and ferric bromide complexed with ethylene glycol or an oligoethylene glycol selected from the group consisting of di-, tri-, and tetraethylene glycol.

In preferred embodiments of this invention, a fuser member of has one or more additional elastomeric layers disposed over the first elastomeric layer. Such second or additional elastomeric layers can be primer layers, thermally conductive or thermally insulating layers formed from any of the elastomeric compositions described above, as well as other materials known in the art for this purpose.

In a more preferred embodiment, a second elastomeric layer on the fuser member is composed of a thermally conductive (that is, heat dissipating) silicone rubber. A preferred thermally conductive elastomeric layer material is a silicone elastomer marketed by Emerson & Cuming Division of Grace Specialty Polymer as EC-4952. This silicone elastomer is a condensation cured organotin catalyzed polydimethylsiloxane elastomer that is heavily loaded with aluminum oxide and iron oxide. EC-4952 exhibits high thermal conductivity and high thermal stability.

Other useful thermally conductive materials are described in U.S. Pat. No. 5,292,606 (noted above), U.S. Pat. No. 5,269,740 (noted above) and U.S. Pat. No. 5,292,562 (noted above), all incorporated herein by reference for such materials.

The thermally conductive silicone rubber layer can be applied after the support having the elastomeric layer is removed from the mold, post-cured, and cooled to room temperature. After coating, the thermally conductive silicone rubber layer is cured by heating in an oven.

The thickness of the thermally conducting layer can be varied to suit a particular use, however, a useful thickness is from about 0.001 to about 0.1 inches (0.00254–0.254 cm). A preferred thickness for a EC-4952 layer over a SILASTIC J RTV elastomeric layer is from about 0.02 to about 0.03 inches (0.051–0.76 cm). If desired, multiple thermally conducting layers can be disposed over the first elastomeric layer of the fuser member.

A thin layer of oil or heat resistant silicone rubber may be applied over any thermally conductive elastomeric layers of the fuser element of this invention, if desired.

The following Examples and Comparative Examples are presented to further illustrate some preferred modes of practice of the method of the invention. Unless otherwise indicated, all starting materials were commercially obtained. The results described in the Examples and Comparative Examples were defined as follows:

no adherence identified as "poor",
more than 10% adherence identified as "fair",
more than 50% adherence identified as "good",
100% adherence identified as "excellent".

Equation 1 identified above was developed by studying the effect of the three variables, "P", "T" and "TP" on the adhesion of the elastomeric layer to the metal support. The variables were transformed in order to calculate a statistical model of the response, adhesion ("A"). The transformation process converts the actual variable levels into scaled, centered values (normally -1, 0 or +1) using the following equations defining the transformed variables:

Equation 2:

$$\tilde{P} = \frac{(P - 650)}{350}$$

wherein $\tilde{P}$ is transformed corona discharge treatment power level "P",

Equation 3:

$$\tilde{T} = \frac{(T - 50)}{40}$$

wherein $\tilde{T}$ is transformed corona discharge treatment time "T", and

Equation 4:

$$\tilde{\tilde{TP}} = \frac{(TP - 67.5)}{52.5}$$

wherein $\tilde{\tilde{TP}}$ is transformed time "TP" between corona discharge treatment and application of the elastomeric layer to the metal support.

The response, "A", was evaluated semi-quantitatively by rating the force required to peel the elastomeric layer off the metal core (support). A rating scale of 0, 1 or 2 was used, as defined by:

Level "0"=elastomeric layer peels off easily (poor adhesion)
Level "1"=elastomeric layer peels off with some difficulty (fair to good adhesion)
Level "2"=elastomeric layer peels off only with extreme difficulty (excellent adhesion).

Using this rating scale, a statistical analysis of the experimental response data was carried out using the transformed variables, resulting in a model of adhesion performance. Transformed treatment power level, $\tilde{P}$, was dropped from the model during the analysis because it had no significant effect over the range of power used at the levels of the other variables studied. The final model of adhesion (A) is defined by Equation 1 noted above.

EXAMPLES 1 TO 18

Several fusing members were prepared according to the present invention, and evaluated as follows. Metal cores of commercially available 6061-T6 aluminum were machined to size and washed to remove machining oil using water-based cleaner for about 5 minutes and then twice rinsed with water. This 6061-T6 metal is a heat-treated aluminum alloy having a nominal composition (in parts by weight): 0.6 Si, 0.25 Cu, 1.0 Mg, 0.25 Cr, and the remainder Al. The cores were then wiped with a lint-free cloth saturated with isopropanol and allowed to dry for at least 5 minutes. Contact with the surfaces of the cores were limited to untreated, non-functional surfaces inside the core.

The metal cores were then treated with corona discharge in ambient air for the time and power levels indicated in TABLE 1 below using a commercially available power supply from Enercon Industries Corp., and an electrode assembly designed to irradiate the metal cores while being rotated.

Within the specified times noted in TABLE 1, each corona discharge treated core was placed in a closed mold having a vent at room temperature, and previously prepared Dow-Corning SILASTIC J RTV silicone material was injected into the mold. The SILASTIC J RTV silicone material was prepared by hand-mixing the rubber base and curing agent in a 10:1 weight ratio, and degassing the mix under a vacuum. For each core, after injecting the SILASTIC J RTV silicone material into the mold, the injection port was sealed, the mold temperature was ramped from 70° to 164° F. (21° to 73° C.) within ten (10) minutes, and then cooled for 15 minutes. Each core was ejected from the mold and then baked to complete the curing process by placing the core in an oven for 1.5 hours ramping from 70° to 425° F. (21° to 218° C.), soaking for 2 hours at 425° F. (218° C.), and ramping down in 1 hour from 425° to 70° F. (218° to 21° C.).

The resulting post-cured elastomeric layers were then evaluated by cutting the layers and examining for areas of non-adherence of the molded silicone to the metal cores. For each of the resulting fuser members, the corona discharge treatment time and power, the time between corona discharge treatment and molding, and the results for the adhesion test of the elastomer to the metal core are listed in TABLE 1 below.

TABLE 1

| Example | Surface Treatment Power (watts) | Surface Treatment Time (seconds) | Time Between Treatment and Molding (minutes) | Final Adhesion to Core |
|---|---|---|---|---|
| 1 | 1000 | 10 | 20 | Excellent |
| 2 | 300 | 90 | 20 | Excellent |
| 3 | 300 | 50 | 20 | Excellent |
| 4 | 650 | 10 | 20 | Fair |
| 5 | 1000 | 90 | 20 | Excellent |
| 6 | 300 | 10 | 20 | Fair |
| 7 | 1000 | 50 | 50 | Excellent |
| 8 | 300 | 10 | 50 | Excellent |
| 9 | 1000 | 10 | 50 | Fair |
| 10 | 1000 | 50 | 50 | Excellent |
| 11 | 650 | 90 | 50 | Excellent |
| 12 | 300 | 10 | 50 | Fair |
| 13 | 650 | 50 | 120 | Excellent |
| 14 | 650 | 50 | 120 | Fair |
| 15 | 1000 | 10 | 120 | Poor |
| 16 | 300 | 10 | 120 | Poor |
| 17 | 300 | 90 | 120 | Excellent |
| 18 | 1000 | 90 | 120 | Excellent |

It can be seen that the final adhesion of elastomeric layer to the treated metal support was the result of a synergistic combination of all three variables: time of treatment, power level of treatment, and time between treatment and molding. At least "good" adhesion was observed over the entire range of all three variables.

EXAMPLES 19–30

The procedure of the previous examples was generally followed except that the corona discharge treatment was for 90 seconds at 800 watts. When the treatment was finished, the elastomeric layers were applied after about 5 minutes. For the various elastomeric compositions, the polymer to cure agent ratios in the silicone elastomers were varied as indicated in TABLE 2 below. The adhesion of the elastomeric layer on the fuser members was tested in the same way as described for Examples 1–18.

The results in TABLE 2 indicate that the amount of the cure agent present in the elastomeric layer may affect the adhesion of a given type of elastomeric layer on a metal core, depending upon the elastomeric material used. Preferred results are obtained using polymer to cure agent ratios of from 10:1 to 5:1.

TABLE 2

| Example | Ratio (Base polymer:Cure agent) | Final Adhesion to Core |
|---|---|---|
| 19 | 15:1 | Excellent |
| 20 | 10:1 | Excellent |
| 21 | 5:1 | Excellent |
| 22 | 5:1 | Excellent |
| 23 | 10:1 | Excellent |
| 24 | 15:1 | Poor |
| 25 | 5:1 | Excellent |
| 26 | 10:1 | Excellent |
| 27 | 15:1 | Poor |
| 28 | 5:1 | Excellent |
| 29 | 10:1 | Excellent |
| 30 | 15:1 | Fair |

EXAMPLE 31

A metal core of 6061-T6 aluminum was machine washed, cleaned and handled as described in Example 1. It was then treated with corona-discharge for 90 seconds at 800 watts as described above. Within 15 minutes, the treated core was coated at 225° F. (107° C.) with Grace Specialty Polymers STYCAST®-4952EK silicone elastomer which had been mixed from rubber base and catalyst in a 280:1 weight ratio. After coating with the silicone material, the fuser member was allowed to cool to room temperature over several hours. The coated metal core was baked for 30 hours to complete the curing process, ramping from 70° to 425° F. (21°–218° C.) in several steps, and ramping back down in one hour.

The resulting post-cured coated fuser member was then evaluated by cutting the silicone layer, and examining for areas of non-adherence of the silicone to the metal core. Adherence was found to be excellent.

Comparative Example 1

Example 1 was repeated except the metal core was not corona discharge treated. The adhesion between the layers was evaluated as described in Example 1 and the results are shown in TABLE 3 below.

Comparative Example 2

A chromate converted metal core having a primed layer of DC-1200 primer from Dow-Corning, was coated with molded SILASTIC-J RTV elastomer, de-molded, post-baked, coated with GSP Stycast™-4952EK silicone rubber, cured, and ground as described above. Such treated metal cores are specifically described in Example 1 of U.S. Pat. No. 5,474,821 (noted above). The metal core was not treated with corona discharge.

Adhesion of the elastomeric layer was tested as described above and the results are in TABLE 3 below.

TABLE 3

| Comparative Example | Metal Core | Metal Core Treatment | Adherence |
| --- | --- | --- | --- |
| 1 | Bare aluminum | none | poor |
| 2 | Chromate converted Aluminum | Primed | poor–good |

While specific embodiments of the invention have been shown and described herein for purposes of illustration, the protection afforded by any patent which may issue upon this application is not strictly limited to a disclosed embodiment, but rather extends to all modifications, arrangements and equivalents that fall fairly within the scope of the claims.

We claim:

1. A method for preparing an electrostatographic member comprising the steps of:
   A) corona discharge treatment of a metal support, and
   B) without intermediate treatment or coating, providing a first elastomeric layer over said corona discharge treated metal support,
   wherein the corona discharge treatment power and time, and the time between steps A and B are governed by the equation:

$$A=1.863+[(0.6274)\times \tilde{T}]+[(-0.2979)\times \tilde{TP}]+[(0.3122\times \tilde{T}\times \tilde{P}]+[(-0.4903)\times \tilde{T}^2]$$

wherein A is the adhesion of said first elastomeric layer to said corona discharge treated metal support, $\tilde{T}$ is the transformed corona discharge treatment time in seconds, and $\tilde{T}\tilde{P}$ is the transformed time between steps A and B in minutes, and the power level of said corona discharge treatment is from about 200 to about 1200 watts for from about 10 to about 200 seconds.

2. The method of claim 1 wherein said electrostatographic member is a fuser member comprising a metal core.

3. The method of claim 2 wherein said metal core is composed of steel, aluminum, copper, nickel, zinc, titanium or magnesium.

4. The method of claim 3 wherein said metal core is composed of aluminum.

5. The method of claim 1 wherein said metal support is cleaned prior to corona discharge treatment.

6. The method of claim 1 wherein the power level of said corona discharge treatment is from about 300 to about 1000 watts for from about 15 to about 150 seconds.

7. The method of claim 1 wherein the power level of said corona discharge treatment is from about 750 to about 850 watts for from about 70 to about 110 seconds.

8. The method of claim 7 wherein the time between steps A and B is 5 minutes or less.

9. The method of claim 1 wherein the power level of said corona discharge treatment is from about 750 to about 850 watts for from about 70 to about 110 seconds, and the time between steps A and B is less than 1 minute.

10. The method of claim 1 wherein said first elastomeric layer is composed of a silicone rubber, fluorosilicone rubber, fluoroelastomer, polyurethane, ethylenepropylene dimer, or mixtures or copolymers thereof.

11. The method of claim 10 wherein said first elastomeric layer is composed of a silicone rubber or fluoroelastomer.

12. The method of claim 11 wherein said first elastomeric layer is composed of a silicone rubber.

13. The method of claim 1 wherein said electrostatographic member is a fuser roller, pressure roller or intermediate transfer member.

14. The method of claim 1 comprising a further step of providing a second elastomeric layer over said first elastomeric layer.

15. The method of claim 14 wherein said second elastomeric layer is composed of a thermally conductive silicone rubber.

16. An electrostatographic member prepared according to the method of claim 1.

17. An electrostatographic fuser roller prepared according to the method of claim 1.

18. An electrostatographic fuser system comprising at least one electrostatographic fuser roller and at least one electrostatographic pressure roller, said fuser roller or said pressure roller, or both, being prepared according to the method of claim 1.

* * * * *